United States Patent Office 3,812,188
Patented May 21, 1974

3,812,188
PURIFICATION OF 7-CHLOROTETRACYCLINE
William M. Ziegler, Clementon, N.J., assignor to American Cyanamid Company, Stamford, Conn.
No Drawing. Filed Aug. 19, 1968, Ser. No. 753,702
Int. Cl. C07c 103/19
U.S. Cl. 260—559 AT                 10 Claims

ABSTRACT OF THE DISCLOSURE

This disclosure describes a process for the purification of 7-chlorotetracycline free base or an anionic salt thereof by suspending the free base or the anionic salt thereof in a concentrated aqueous solution of urea thus forming 7-chlorotetracycline-urea complex and selectively removing the impurities, and regenerating purified 7-chlorotetracycline free base or a mineral acid salt thereof from the resultant complex.

BRIEF SUMMARY OF THE INVENTION

This invention relates to a process for purifying 7-chlorotetracycline free base or an anionic salt thereof which comprises suspending the free base or the anionic salt thereof in a concentrated aqueous solution of urea, adjusting the pH of the suspension to from about 3.5 to about 5.5 when an anionic salt of 7-chlorotetracycline is employed, and agitating the suspension at ambient temperatures for a period of time whereby the impurities are selectively dissolved. The insoluble 7-chlorotetracycline-urea complex thus formed is then removed from the suspension and suspended in water, the aqueous suspension is acidified with a mineral acid to a pH of from about 0.5 to about 2.0 and agitated at ambient temperatures for a period of time, and the insoluble corresponding mineral acid salt of 7-chlorotetracycline is then recovered from this suspension. In a similar manner, suspension of the 7-chlorotetraacycline-urea complex in water, acidification of the suspension with a mineral acid to a pH of from about 0.5 to about 2.0 followed by adjustment of the pH to from about 4.0 to about 6.5, and then agitation at ambient temperatures for a period of time converts it to 7-chlorotetracycline free base in a purified form.

DETAILED DESCRIPTION OF THE INVENTION

In the production of 7-chlorotetracycline by fermentative biosynthesis which involves the cultivation of certain selected strains of microorganisms of the genus Streptomyces, there is encountered the concurrent production of tetracycline and 7-chloro-4-*epi*-tetracycline as impurities in the fermentation broth. The amount of tetracycline and 7-chloro-4-*epi*-tetracycline so produced is dependent, among other factors, upon the selected strains of microorganisms of the genus Streptomyces employed in addition to the nature of the medium used. Where 7-chlorotetracycline is the desired antibiotic to be recovered, a difficult problem of purification arises due to the very similar physical and chemical properties of tetracycline, 7-chlorotetracycline and 7-chloro-4-*epi*-tetracycline. Present methods for the removal of small amounts of tetracycline and 7-chloro-4-*epi*-tetracycline from 7-chlorotetracycline are not considered satisfactory and a better method is needed. The prior art methods of crystallization are not effective in removing tetracycline and 7-chloro-4-*epi*-tetracycline since these impurities have a pronounced tendency to co-crystallize with 7-chlorotetracycline.

The present inevntion is based upon the discovery that treatment of impure 7-chlorotetracycline free base or a 7-chlorotetracycline anionic salt with a concentrated aqueous solution of urea selectively dissolves the tetracycline and 7-chloro-4-*epi*-tetracycline impurities and the 7-chlorotetracycline is converted to the insoluble crystalline urea complex. In this crystallization step either 7-chlorotetracycline free base or a 7-chlorotetracycline anionic salt such as, for example, 7-chlorotetracycline hydrochloride, 7-chlorotetracycline hydrobromide, 7-chlorotetracycline sulfate, 7-chlorotetracycline phosphate, etc. may be employed as starting material. This crystallization step is carried out by first suspending the starting material in from about 3 ml. to about 12 ml. per gram of starting material of an aqueous solution of urea having a concentration of from about 33% by weight to about 54% by weight of urea. If a concentration of urea below 33% is used, the urea complex is not formed but the amphoteric form is obtained, and the purification effected is much inferior. Although considerably more than 12 ml. of urea solution per gram of starting material may be readily employed in this crystallization step, no particular advantage is realized in so doing. This would be due to the necessity of larger equipment of greater volume and to marginal losses by reason of increased solubility of the starting material. When a 7-chlorotetracycline anionic salt is employed as the starting material, the pH of the suspension is then adjusted to from about 3.5 to about 5.5 with a base. This pH adjustment may be accomplished with any convenient base such as, for example, aqueous ammonia, e.g. 28% aqueous ammonia; aqueous alkali metal hydroxides, e.g. 10% aqueous NaOH or 10% aqueous KOH; sodium bicarbonate or soda ash in solid form; etc. When 7-chlorotetracycline free base is employed as the starting material, adjustment of the pH of the suspension is not necessary. The suspension is then agitated at a temperature of from about 15° C. to about 35° C. for a period of time of from about one hour to about four hours or more. Preferably, the suspension is conveniently stirred at room temperature (about 25° C.) for about 2 to 3 hours since no particular advantage is gained by agitating the suspension for extended periods of time. When starting with 7-chlorotetracycline neutral, the conversion to the urea complex is not apparent by observation since the complex crystallizes from a slurry of the free base form. At the end of this time, the insoluble urea complex in the suspension is separated by any convenient method such as filtration or centrifugation. The urea complex or adduct has the composition of one half mole of urea per mole of 7-chlorotetracycline.

The regeneration step is carried out by first suspending the separated 7-chlorotetracycline-urea complex in water (about 2–10 ml. of water per gram of complex) and acidifying this aqueous suspension with a mineral acid to a pH of from about 0.5 to about 2.0. This suspension is then agitated at a temperature of from about 15° C. to about 35° C. for a period of time of from about one hour to about four hours or more. Preferably, the suspension is conveniently stirred at room temperature (about 25° C.) for about 2 to 3 hours since no particular advantage is gained by agitating the suspension for extended periods of time. At the end of this time, the insoluble 7-chlorotetracycline mineral acid salt in the suspension is removed by any convenient method such as filtration or centrifugation. The 7-chlorotetracycline mineral acid salt so obtained corresponds, of course, to the mineral acid employed to acidify the aqueous suspension and suitable mineral acids for this purpose are those which provide salts of 7-chlorotetracycline having limited water solubility such as, for example, hydrochloric acid, hydrobromic acid, phosphoric acid, and the like. In a similar manner, suspension of the 7-chlorotetracycline-urea complex in water, acidification of the suspension with a mineral acid to a pH of from about 0.5 to about 2.0 followed by adjustment of the pH of from about 4.0 to about 6.5 with a base, and then agitation at a temperature of from about 15° C. to about 35° C. for a period of time of from about one hour to about four hours or more converts it to 7-chlorotetracycline free base. This pH adjustment may be accomplished with any convenient mineral acids or bases such as those set forth hereinabove. Preferably, the suspension is also conveniently stirred at room temperature (about 25° C.) for about 2 to 3 hours after which the 7-chlorotetracycline free base is removed from the suspension by filtration or centrifugation. The purified 7-chlorotetracycline mineral acid salt of 7-chlorotetracycline free base thus obtained may then be dried by any convenient means and employed directly in the formulation of pharmaceutical preparations.

The invention will be described in greater detail in conjunction with the following specific examples.

EXAMPLE 1

Purification of 7-chlorotetracycline hydrochloride using a 50% urea solution

A 20 gram portion of 7-chlorotetracycline hydrochloride containing 5.2% tetracycline and 3.5% 7-chloro-4-epi-tetracycline was added to 80 milliliters of a 50% by weight aqueous urea solution and, while stirring, the pH of the mixture was adjusted to 4.5 with concentrated (28%) ammonia water. The resulting suspension was stirred for 2½ hours at room temperature, filtered, and the residual cake washed with 80 milliliters of water. The residual cake was suspended in 50 milliliters of water and 5 milliliters of concentrated (37%) hydrochloric acid was added. The mixture was stirred for three hours at room temperature and the product was removed by filtration, washed with 50 milliliters of 0.1 N hydrochloric acid and vacuum dried. The yield was 90.7%. The purified 7-chlorotetracycline hydrochloride so obtained contained 3.1% tetracycline and 2.0% 7-chloro-4-epi-tetracycline.

EXAMPLE 2

Purification of 7-chlorotetracycline hydrochloride using a 40% urea solution

A 20 gram portion of 7-chlorotetracycline hydrochloride containing 5.0% tetracycline and 3.4% 7-chloro-4-epi-tetracycline was added to 80 milliliters of a 40% by weight aqueous urea solution and, while stirring, the pH of the mixture was adjusted to 4.5 with concentrated (28%) ammonia water. The resulting suspension was stirred for 2½ hours at room temperature, filtered, and the residual cake washed with 80 milliliters of water. The residual cake was suspended in 50 milliliters of water and 5 milliliters of concentrated (37%) hydrochloric acid was added. The mixture was stirred for three hours at room temperature and the product was removed by filtration, washed with 50 milliliters of 0.1 N hydrochloric acid and vacuum dried. The yield was 89.0%. The purified 7-chlorotetracycline hydrochloride so obtained contained 3.5% tetracycline and 1.2% 7-chloro-4-epi-tetracycline.

EXAMPLE 3

Purification of 7-chlorotetracycline hydrochloride using a 33% urea solution

A 20 gram portion of 7-chlorotetracycline hydrochloride containing 4.7% tetracycline and 3.3% 7-chloro-4-epi-tetracycline was added to 80 milliliters of a 33% by weight aqueous urea solution and, while stirring, the pH of the mixture was adjusted to 4.5 with concentrated (28%) ammonia water. The resulting suspension was stirred for 2½ hours at room temperature, filtered, and the residual cake washed with 80 milliliters of water. The residual cake was suspended in 50 milliliters of water and 5 milliliters of concentrated (37%) hydrochloric acid was added. The mixture was stirred for three hours at room temperature and the product was removed by filtration, washed with 50 milliliters of 0.1 N hydrochloric acid and vacuum dried. The yield was 85.8%. The purified 7-chlorotetracycline hydrochloride so obtained contained 3.8% tetracycline and 2.2% 7-chloro-4-epi-tetracycline.

EXAMPLE 4

Preparation of 7-chlorotetracycline from 7-chlorotetracycline-urea complex

A slurry of 50 g. of 7-chlorotetracycline-urea complex in 500 ml. of water and adjusted to pH 1.8 by the addition of 35% aqueous hydrochloric acid. After stirring for five minutes, the resultant solution was adjusted to pH 4.5 with 28% aqueous ammonium hydroxide. After a crystallization time of one hour, the purified amphoteric form of 7-chlorotetracycline was collected by filtration, washed with water and dried. A yield of 42 g. was obtained.

I claim:

1. The process which comprises the steps of suspending impure 7-chlorotetracycline in from about 3 ml. to about 12 ml. per gram of the 7-chlorotetracycline of an aqueous solution of urea having a concentration of from about 33% by weight to about 54% by weight of urea, agitating said first suspension at a temperature of from about 15° C. to about 35° C. for a period of time, separating 7-chlorotetracycline-urea complex from said aqueous urea solution, suspending said complex in water and acidifying said second suspension with a mineral acid to a pH of from about 0.5 to about 2.0, agitating said second suspension at a temperature of from about 15° C. to about 35° C. for a period of time, and separating insoluble 7-chlorotetracycline mineral acid salt from said acidified water solution.

2. A process according to claim 1 wherein about 4 ml. of a 40% by weight urea solution per gram of 7-chlorotetracycline is employed, both suspensions are agitated at a temperature of about 25° C. for about 3 hours, the mineral acid is 37% aqueous hydrochloric acid, and the 7-chlorotetracycline mineral acid salt so obtained is 7-chlorotetracycline hydrochloride.

3. A process according to claim 1 wherein about 4 ml. of a 33% by weight urea solution per gram of 7-chlorotetracycline is employed, both suspensions are agitated at a temperature of about 25° C. for about 3 hours, the mineral acid is 37% aqeous hydrochloric acid, and the 7-chlorotetracycline mineral acid salt so obtained is 7-chlorotetracycline hydrochloride.

4. The process which comprises the steps of suspending impure 7-chlorotetracycline in from about 3 ml. to about 12 ml. per gram of the 7-chlorotetracycline of an aqueous solution of urea having a concentration of from about 33% by weight to about 54% by weight of urea, agitating said first suspension at a temperature of from about 15° C. to about 35° C. for a period of time, separating 7-chlorotetracycline-urea complex from said aqueous urea solution, suspending said complex in water and acidifying said second suspension with a mineral acid to a pH of from about 0.5 to about 2.0, adjusting the pH of said second suspension to from about 4.0 to about 6.5 with a base, agitating said second suspension at a temperature of from about 15° C. to about 35° C. for a period of time, and separating insoluble 7-chlorotetracycline free base from said water solution.

5. The process which comprises the steps of suspending an impure 7-chlorotetracycline anionic salt in from about 3 ml. to about 12 ml. per gram of the 7-chlorotetracycline anionic salt of an aqueous solution of urea having a concentration of from about 33% by weight to about 54% by weight of urea, adjusting the pH of said first suspension to from about 3.5 to about 5.5 with a base, agitating said first suspension at a temperature of from about 15° C. to about 35° C. for a period of time, separating 7-chlorotetracycline-urea complex from said aqueous urea solution, suspending said complex in water and acidifying said second suspension with a mineral acid to a pH of from about 0.5 to about 2.0, agitating said second suspension at a temperature of from about 15° C. to about 35° C.

for a period of time, and separating insoluble 7-chlorotetracycline mineral acid salt from said acidified water solution.

6. A process according to claim 5 wherein about 4 ml. of a 50% by weight urea solution per gram of 7-chlorotetracycline hydrochloride is employed, the base is 28% aqueous ammonia, both suspensions are agitated at a temperature of about 25° C. for about 3 hours, the mineral acid is 37% aqueous hydrochloric acid, and the 7-chlorotetracycline mineral acid salt so obtained is 7-chlorotetracycline hydrochloride.

7. A process according to claim 5 wherein about 4 ml. of a 40% by weight urea solution per gram of 7-chlorotetracycline hydrochloride is employed, the base is 28% aqueous ammonia, both suspensions are agitated at a temperature of about 25° C. for about 3 hours, the mineral acid is 37% aqueous hydrochloric acid, and the 7-chlorotetracycline mineral acid salt so obtained is 7-chlorotetracycline hydrochloride.

8. A process according to claim 5 wherein about 4 ml. of a 33% by weight urea solution per gram of 7-chlorotetracycline hydrochloride is employed, the base is 28% aqueous ammonia, both suspensions are agitated at a temperature of about 25° C. for about 3 hours, the mineral acid is 37% aqueous hydrochloric acid, and the 7-chlorotetracycline mineral acid salt so obtained is 7-chlorotetracycline hydrochloride.

9. A process according to claim 5 wherein about 5 ml. of a 54% by weight urea solution per gram of 7-chlorotetracycline sulfate is employed, the base is 10% aqueous sodium hydroxide, the first suspension is agitated at a temperature of about 20° C. for about 2 hours, the mineral acid is 37% aqueous hydrobromic acid, the second suspension is agitated at a temperature of about 30° C. for about 3 hours, and the 7-chlorotetracycline mineral acid salt so obtained is 7-chlorotetracycline hydrobromide.

10. The process which comprises the steps of suspending an impure 7-chlorotetracycline anionic salt in from about 3 ml. to about 12 ml. per gram of the 7-chlorotetracycline anionic salt of an aqueous solution of urea having a concentration of from about 33% by weight to about 54% by weight of urea, adjusting the pH of said first suspension to from about 3.5 to about 5.5 with a base, agitating said first suspension at a temperature of from about 15° C. to about 35° C. for a period of time, separating 7-chlorotetracycline-urea complex from said aqueous urea solution, suspending said complex in water and acidifying said second suspension with a mineral acid to a pH of from about 0.5 to about 2.0, adjusting the pH of said second suspension to from about 4.0 to about 6.5 with a base, agitating said second suspension at a temperature of from about 15° C. to about 35° C. for a period of time, and separating insoluble 7-chlorotetracycline free base from said water solution.

References Cited
UNITED STATES PATENTS

| | | | |
|---|---|---|---|
| 3,632,647 | 1/1972 | Greenbaum et al. | 260—559 AT |
| 2,875,247 | 2/1959 | Fox et al. | 260—559 AT |
| 2,905,662 | 9/1959 | Smith et al. | 260—559 AT |
| 3,037,973 | 6/1962 | Sarcona et al. | 260—559 AT |

DONALD G. DAUS, Primary Examiner

A. M. T. TIGHE, Assistant Examiner

U.S. Cl. X.R.

260—96.5